May 20, 1941. V. W. LEUSCH 2,242,726
FISHING LURE
Filed Aug. 12, 1940
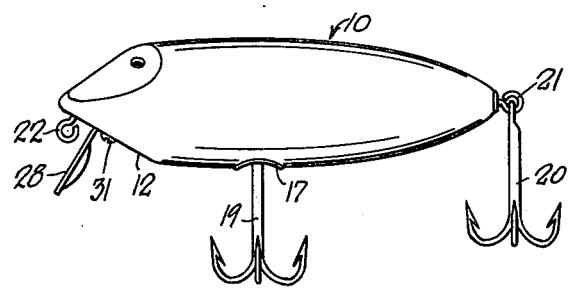
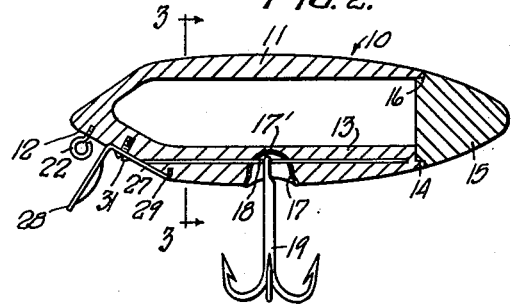
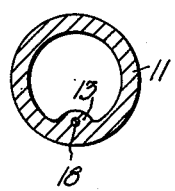
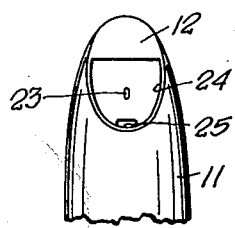
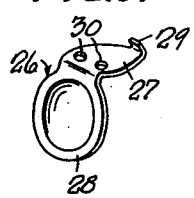
INVENTOR.
VICTOR WILLIAM LEUSCH
BY
Oltsch & Knoblock
ATTORNEYS.

Patented May 20, 1941

2,242,726

UNITED STATES PATENT OFFICE 2,242,726

FISHING LURE

Victor William Leusch, South Bend, Ind., assignor to South Bend Bait Company, South Bend, Ind., a corporation of Indiana Application August 12, 1940, Serial No. 352,218

3 Claims. (Cl. 43—46)

This invention relates to improvements in fishing lures.

Many fishing lures employ deflecting or diving plates for the purpose of imparting diving and darting action to the lure as it is drawn through the water. These plates must be accurately positioned in order to assure the desired action and to obtain the proper balance of the lure. Heretofore it has been customary to either use eye measurement in applying the plate, which is unsatisfactory from the standpoint of lack of accuracy and uniformity; or to employ a template to guide application of the plate, which is objectionable from the standpoint of the time and manipulations required in the operation. The manner in which a hook is mounted or secured, especially to a hollow bait body, is also of considerable importance in lure manufacture. One method of so doing is to employ a wire passed through a longitudinal bore through the wall of the lure body which has a recess intermediate the ends of the bore into which the eye of a hook may project to be threaded on said wire. Such a construction generally required separate means for securing the wire against endwise release from its bore.

It is, therefore, the primary object of this invention to provide a lure having a diving plate with novel means for positioning and securing the plate to the body.

A further object is to provide a lure body with a configured shallow recess conforming in size and shape to the securing flange of a diving plate and snugly receiving the same substantially flush with the adjacent surfaces of the body.

A further object is to provide a lure body having an indent with which an angularly bent lug projecting from a diving plate is adapted to interlock to assist in positioning and securing the plate to the body with a minimum number of securing members.

A further object is to provide a lure body having a passage therein and a hook-receiving socket communicating with and intersecting said passage, with a wire in said passage for mounting a hook in said socket, and a deflecting plate secured to the body to cover the end of said passage and lock the wire in said passage.

Other objects will be apparent from the description and appended claims.

In the drawing:

Fig. 1 is a view of a lure in side elevation.

Fig. 2 is a longitudinal vertical sectional view of a lure.

Fig. 3 is a transverse sectional view taken on line 3—3 of Fig. 2.

Fig. 4 is a fragmentary bottom elevation of the lure body.

Fig. 5 is a perspective view of the deflecting plate.

Referring to the drawing, which illustrates the preferred embodiment of the invention, the numeral 10 designates a bait body which is preferably formed of two molded parts of plastic material, such as cellulose acetate. The front part 11 of the body is hollow and has a suitable head configuration including a lower substantially flat inclined face 12. Body part 11 is hollow, with its rear end open, and has a longitudinal internal rib or thickened wall portion 13 at its bottom. A suitable bore 23 of small diameter extends longitudinally and substantially centrally through rib 13. Intermediate the ends of body part 11 is formed a pocket or recess 17' which intersects and communicates with said longitudinal passage 23 and projects inwardly thereof but terminates within rib 13. The rear end of body part 11 terminates in an integral ring portion 14 of uniform circumferential thickness. The rear part 15 of the body is preferably solid and has a reduced portion 16 thereof fitting within ring portion 14 of body part 11; said part 15 merging with part 11 to form a continuous body surface of desired shape.

A metal cup shaped liner member 17 fits snugly in the pocket or recess of body part 11, and has opposed apertures therein through which a wire 18 in the passage 23 may extend to lock said liner member in place. Wire 18 passes through the eye of a belly hook 19 to swivelly mount the same within the pocket.

A rear hook 20 may be secured to the lure body by an eyelet 21 threaded into body part 15. A line attaching eyelet 22 may be threaded into a thickened portion of the body part 11 at the forward end thereof.

A flat shallow configured depression 24 is formed in the body part 11 at the portion of face 12 thereof at which passage 23 opens. At the rear end of said shallow depression is provided a small comparatively deep opening or recess 25 extending at a slight angle to the perpendicular with relation to the plane of depression 24. Both depression and opening are preferably formed during molding of body part 11.

A diving plate fixture 26, best illustrated in Fig. 5, comprises a flat configured flange or plate portion 27, a configured deflecting plate portion 28 projecting angularly from portion 27, and a small lug portion 29 bent angularly from portion 27 at the end thereof opposite portion 28 and in the opposite direction. Plate portion 27 is provided with one or more apertures 30 spaced from lug 29. The size and shape of plate portion 27 fully conform to depression 24, and the depth of said depression substantially conforms to the thickness of plate portion 27 of the fixture. Screws 31 may be threaded in the interior thickened rib of the body, passing through apertures 30 to secure fixture 26 to place.

It will be seen from the above that the accessories of the lure are readily and easily applied or secured to body 10. Thus, liner 17 is inserted in its receiving socket, and wire 18 is passed through the apertures thereof and the eye of hook 19. Then fixture 26 is applied to the body with part 27 thereof snugly seating in recess 24 and lug 29 hooking in opening 25. Screws 31 may then be threaded into the body, and the belly hook and diving plate are all fixedly secured to place solely by the screws 31 and the hooked engagement of lug 29 with the body opening. No jigs need be used to guide application of the diving plate, and yet absolute accuracy of position and balance is assured. The hooked engagement of lug 29 in opening 25 reduces the number of screws required at a minimum. The recessed seating of fixture part 27 also insures stream lined lure surfaces, with the outer face thereof lying flush with and forming a continuation of face 12 of the lure body.

I claim:

1. A fishing lure comprising a body having a bore therein open at one end, a pocket intersecting said bore, a shallow depression surrounding the open end of said bore and a deep restricted recess communicating with said depression, a hook extending into said pocket and having an eye, an elongated member in said bore passing through the hook eye, a water reactance member having a base seating snugly in said depression, a lug projecting from said base for hooked engagement in said recess, and a securing member spaced from and cooperating with said lug for securing said member to said body.

2. A fishing lure comprising a body having a bore therein open at one end and a pocket intersecting said bore, a hook extending into said pocket, an elongated member in said bore mounting said hook, and a water reactance fixture having a portion secured to said body to close the open end of said bore and lock said member therein.

3. A fishing lure as defined in claim 2, wherein said body has a shallow depression surrounding the open end of said bore in which said fixture seats in precise relation to the body determined by the depression.

VICTOR WILLIAM LEUSCH.